United States Patent [19]

Hall, Jr. et al.

[11] 4,388,721
[45] Jun. 14, 1983

[54] THROAT UPWELL BAFFLE

[75] Inventors: Herbert L. Hall, Jr., Newark; Isac M. Sheinkop, Reynoldsburg, both of Ohio

[73] Assignee: Owens-Corning Fiberglas Corporation, Toledo, Ohio

[21] Appl. No.: 289,568

[22] Filed: Aug. 3, 1981

[51] Int. Cl.³ .............................................. C03B 5/027
[52] U.S. Cl. ...................................... 373/31; 373/122; 65/342
[58] Field of Search ........................... 373/30, 31, 122; 165/336, 342, 346, 347, 374.1

[56] References Cited

U.S. PATENT DOCUMENTS

| 1,657,106 | 1/1928 | Brownlee | 65/342 |
| 1,706,132 | 3/1929 | Atwood | 65/342 |
| 2,899,476 | 8/1959 | Gell | 373/31 |
| 4,246,432 | 1/1981 | Rinkes et al. | 373/30 |
| 4,325,693 | 4/1982 | Ackerman | 373/30 |

Primary Examiner—Roy N. Envall, Jr.
Attorney, Agent, or Firm—Ronald C. Hudgens; Patrick P. Pacella; Philip R. Cloutier

[57] ABSTRACT

A chimney baffle is positioned against a vertical refractory wall extending from a channel through which hot glass is flowing to reduce deterioration of the refractory of the vertical wall.

7 Claims, 3 Drawing Figures

THROAT UPWELL BAFFLE

BACKGROUND OF THE INVENTION

This invention relates to furnaces. In one of its more specific aspects, this invention relates to a means for, and a method of, reducing refractory wear and spalling within a glass furnace and, more particularly, in glass furnace throats.

The use of refractory-lined furnaces to melt glass batch to produce melted glass from which glass fibers are formed is well known. In some types of furnaces, the melted glass is passed from the melting portion of the furnace through one or more channels having a throat, all of which construction is refractory lined. Because of the velocity and temperature of the glass through such a throat, considerable wear, or spalling, of the refractory can take place. This results in two disadvantages; first, the furnace life can be shortened with the result that considerable downtime for repairs is required and, secondly, some portion of the refractory becomes included in the glass as small particles which act to diminish the efficiency of downstream portions of the equipment. For example, when the melted glass containing such particles is introduced into bushings from which glass fibers are pulled, these particles can plug the apertures of the bushing, thus decreasing the amount of glass fibers which can be continuously drawn through the bushing.

Such refractory wear is generally concentrated at exits from narrow passages or at sharp angular changes in the direction of the glass flow in the channels leading from the furnace and the high temperatures existing at such points contribute significantly to that wear.

STATEMENT OF INVENTION

There has now been discovered a method of decreasing deterioration and wearing of the refractory at such sharp angular changes in the direction of the glass flow at, or in, the channels leading from such furnaces which comprises separating a portion of the glass flowing at such a locus, cooling the portion of the glass separated and causing the cooled portion of the glass to circulate through a separate flow path in indirect heat exchange relationship to the potential locus of deterioration and to cool the refractory at that locus adjacent to the separated flow path.

Also, according to this invention, there is provided, in a refractory duct having a sharp-angle configuration subject to wear, means for circulating a portion of the glass flowing at the sharp-angle configuration into a cooling zone and into indirect heat-exchange with the sharp-angle configuration to reduce the temperature thereof.

In the preferred embodiment of this invention, chimney, or baffle, means are positioned in contact with the sharp-angle configuration of the refractory to affect the circulation and to provide a heat transmitting surface through which heat is exchanged, thus protecting the refractory from deterioration.

DESCRIPTION OF THE DRAWINGS

The invention will be more easily understood if explained in conjunction with the attached drawings in which:

Referring now to FIGS. 1 and 2, there is shown furnace 1 which may be heated in any suitable manner, for example, by electrodes or by gas firing. The melted glass and glass batch is typically carried a level 6, as shown in FIG. 2. The melted glass 7 flows from the furnace through throat, or channel, 2, up up-well, or channel, 4 and through channel 5 to its ultimate fiber-forming destination.

The glass flowing through throat 2 makes a sharp angular upward change in direction at locus 8. As a result of the flow currents established and the high temperature at which the glass is flowing, considerable deterioration or spalling of the refractory takes place at locus 8.

According to this invention, to decrease the amount of spalling at locus 8 there is installed immediately adjacent riser wall 12, chimney, or baffle, means 9.

Figure 1:
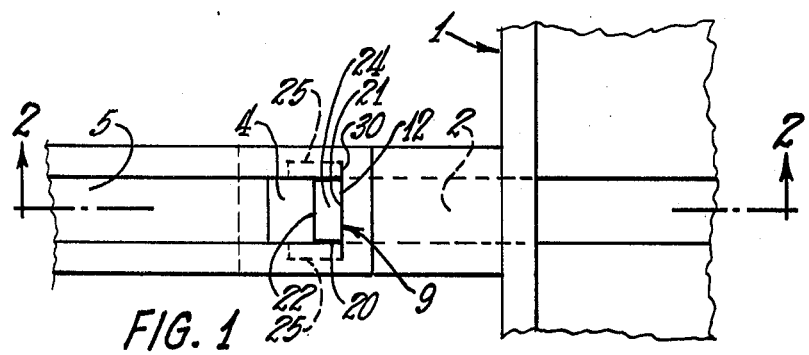
FIG. 1 is a plan view of a typical furnace relative to which the invention is applicable.
Figure 2:
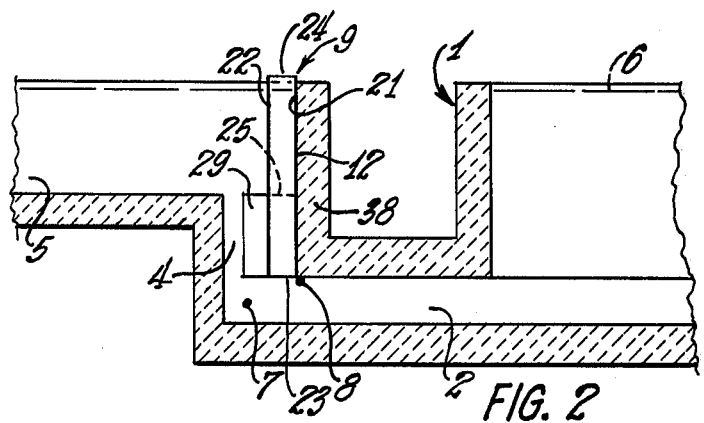
FIG. 2 is a view in elevation of the furnace through Section 2—2 of FIG. 1.
Figure 3:
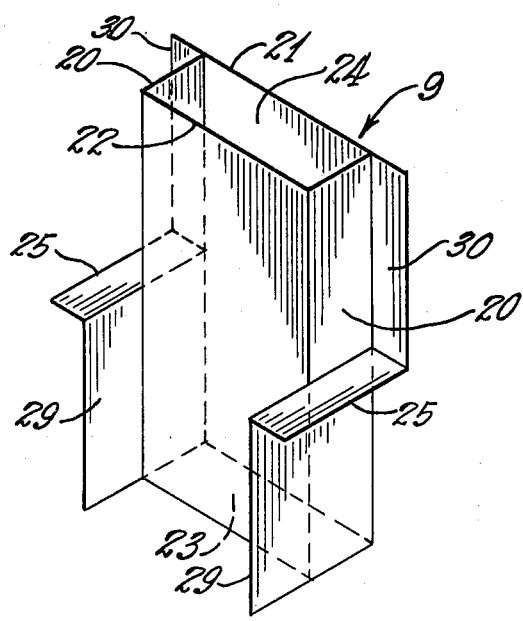
FIG. 3 is an isometric view of chimney, or baffle, means for affecting the recirculation of the stream of glass and protection of the refractory.

Chimney means 9 can be any open-ended enclosure such as shown in FIG. 3. It will consist of side walls 20, front wall 22 and rear wall 21. The chimney will be open at its bottom 23 and can be open at its top 24. It can be adapted with any suitable means for affixing to the refractory. The chimney's bottom 23 will be positioned to coincide with the bottom of the vertical refractory wall 8 of throat 2 and its open end will extend to a height greater than that height to which glass rises in channel 5. The chimney will be of sufficient width to span the width of the throat and the chimney's depth, that is, its dimension in the direction of the flow of the glass in throat 2 will be from about 20 to about 35 percent of the width of up-well portion 4 of throat 2, preferably 33 percent.

The chimney can be constructed of any suitable material such as molybdenum, platinum and the like. While it can be of various shapes, preferably it will be in the shape of a vertically oriented open-ended parallelpiped. While it can be adapted with any means of support, it will preferably be adapted with two flanges 25 which provide for support and which also prevent glass from circumventing the baffle due to possible refractory wear. Also, it will preferably be fitted with vertical extensions 29 and wings 30 which facilitate stationary fitting of the chimney within the channel.

The additional cooling effect on the refractory at locus 8 would seem to be accomplished by the circulation which is established within the chimney in which some portion of the glass flowing proximate the lower extremity of the baffle rises within the chimney and along its outer wall, then reverses its flow after cooling and passes in indirect heat exchange with the refractory to cool the refractory and to diminish deterioration of the refractory at the inner bottom portion of the chimney. The interpositioning of a chimney with its inner wall, which serves as a protective wall for the riser wall thus reducing spalling of the riser wall, provides for a greater and more regulated circulation proximate the wall and provides a heat protecting shield between the glass and the riser wall to cool the latter.

It will be evident from the foregoing that various modifications can be made to this invention. Such, however, are considered within the scope of the invention.

What is claimed is:

1. A method of decreasing deterioration of a vertical refractory wall in a channel conducting hot fluid glass from a melting furnace which comprises positioning a chimney having vertical walls in contact with said vertical refractory wall to form a flow of said fluid glass within said chimney in indirect heat exchange with said vertical refractory wall through one of said vertical walls of said chimney to cool said refractory wall.

2. In a channel for conducting fluid glass which channel comprises a refractory duct and a channel extending vertically therefrom and formed by upstream and downstream vertical walls, the improvement comprising a chimney having vertical walls and open at its lower end being positioned in contact with said upstream vertical wall.

3. The apparatus of claim 2 in which said chimney is affixed to the vertical refractory wall over its entire height.

4. The apparatus of claim 2 in which the lower extremity of said chimney is positioned coincident with the lower extremity of said vertical refractory wall.

5. The apparatus of claim 2 in which the upper extremity of said chimney is positioned above the upper extremity of said vertical refractory wall.

6. The apparatus of claim 2 in which said chimney is as wide as the width of said vertical refractory wall.

7. The apparatus of claim 2 in which said chimney extends outwardly from said vertical refractory wall a distance of from about 20 to about 35 percent of the of the channel.

* * * * *